May 3, 1932.　　　　J. G. KOPSKY　　　　1,856,959
HUB FOR CRANK HANGERS AND WHEELS OF BICYCLES
Filed April 11, 1931　　2 Sheets-Sheet 1
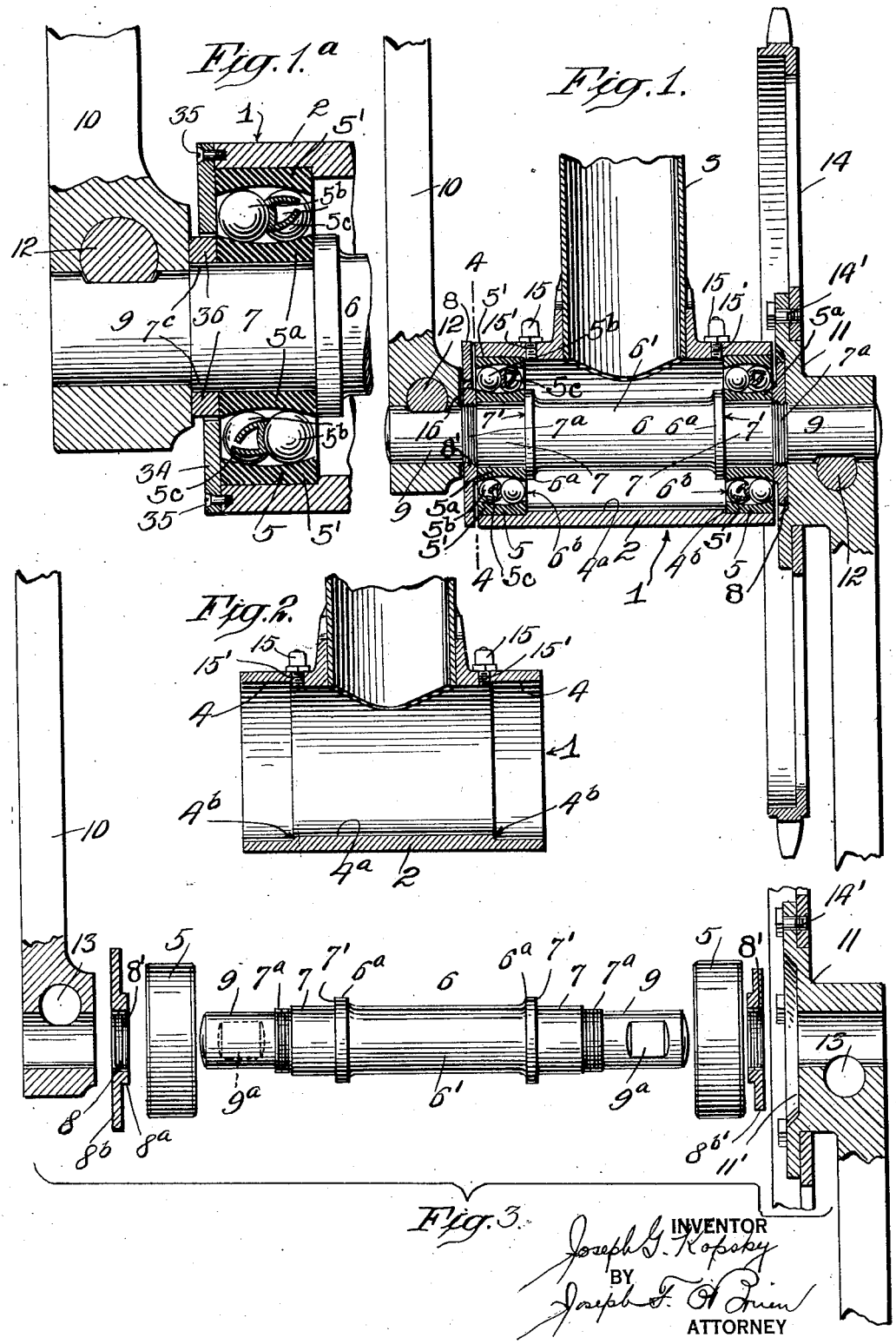

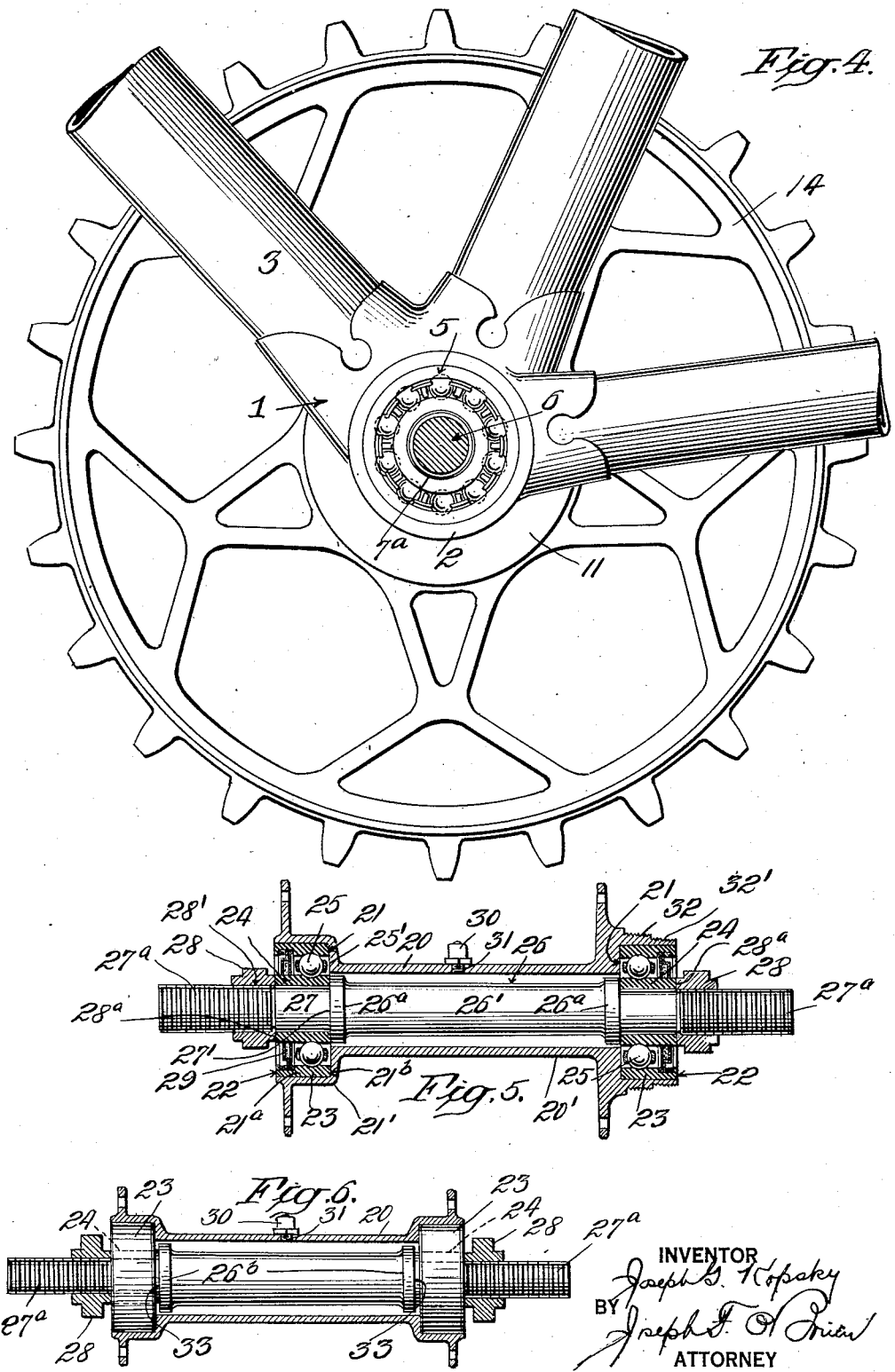

Patented May 3, 1932

1,856,959

UNITED STATES PATENT OFFICE

JOSEPH G. KOPSKY, OF UNION CITY, NEW JERSEY

HUB FOR CRANK HANGERS AND WHEELS OF BICYCLES

Application filed April 11, 1931. Serial No. 529,421.

This invention relates to improvements in hubs for crank hangers and wheels of bicycles.

The primary object of this invention is to produce a novel hub for bicycle crank-hangers and bicycle wheels in which ballbearing units may be mounted to enable increased efficiency in the ballbearing co-action between the hub-casings and spindles, which will enable a double bearing to be produced in which the ballbearings will be completely inclosed and kept free from dust and dirt while at the same time providing for lubrication of the ball members in the ballbearing units.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a vertical section through an assembled hanger hub embodying my invention;

Fig. 1$^a$ is a sectional view similar to Fig. 1 of one end of a hub casing and showing a slightly modified form of my invention;

Fig. 2 is a section, similar to Fig. 1, showing the hub casing separated from the other parts;

Fig. 3 is a disassembled view, partly in section and partly in elevation, of the spindle and associated parts of the hanger;

Fig. 4 is a section on the line 4—4 of Fig. 1;

Fig. 5 is a vertical section through a driving-wheel hub showing a modified form of my invention; and Fig. 6 is a vertical section of a front-wheel hub showing said modified form of my invention applied thereto.

Referring now to these drawings, 1 indicates a hanger-hub comprising a hub-casing 2 suitably supported or hung from frame bars 3 and provided at opposite sides or ends with seats 4, 4 for ballbearing units 5 comprising an outer ball-race member 5', an inner ball-race member 5$^a$ having two series of balls 5$^b$ arranged between the race members and held in place by spacing retainers 5$^c$. Said seats 4 are of a diameter increased over the central portion 4$^a$ to form radial shoulders 4$^b$ and are adapted to frictionally engage the outer periphery and one radial side edge of the outer ball-race member 5' of said ballbearing unit 5.

A spindle 6, having a middle portion 6' of given diameter is provided at opposite sides of said middle portion with integral collars 6$^a$ of increased diameter but of such size as to be spaced from the inner surface of the casing so as to permit lubricating material to reach the balls 5' through the annular space 6$^b$ from lubricating apertures hereinafter described and located at the inner side of the seats 4, and at the outer sides of these collars I form seats 7 for the reception of the inner race-members 5$^a$ of said ballbearing units 5. The seats 7 are reduced in diameter to form radial shoulders 7' adapted to be arranged in vertical alignment with the radial shoulders 4$^b$ in the hub case. The spindle 6 is provided at the side of said seat 7 opposite to the radial shoulders 7' with reduced screw-threaded sections 7$^a$ adapted to receive nut-washers 8 having internal screw-threaded bores 8' and provided with annular centrally-located hub-portions 8$^a$ adapted to engage the outer radial edges of the inner race members 5$^a$ and to securely clamp the same against the shoulders 7'. The opposite ends of the spindle are still further reduced in diameter to provide seats 9 for the crank member 10 at one side and for the combined crank and sprocket 11 at the other side, and these seats are provided with locking notches 9$^a$ adapted to engage locking pins 12 which are passed through pin holes 13 in the hubs of members 10 and 11 to securely fasten these members 10 and 11 to opposite ends of the spindle. The radial washer-flange 8$^b$ of the nut-washer 8 at one side of the hub is of a diameter sufficient to substantially register with the outer surface of the hub casing to close the outer radial face of the ballbearing unit while the radial flange 8$^{b'}$ at the other side is somewhat reduced to fit within a hollow or depression 11' in the hub of said member 11 and the inner face of this hub portion, in conjunction with the washer portion 8ᵇ′ close the radial face of the unit at that side.

As illustrated, the member 11 has a sprocket-wheel 14 mounted on the same and fastened thereto by bolts 14′.

Means for lubricating the ballbearing units is provided and in the embodiment shown, I employ lubricating cups 15 mounted above holes 15′ positioned above the spindle adjacent to the ballbearing units. The nut washers are also preferably provided with holes 16 in alignment with the balls of the units so that lubricating oil may be fed directly into the outer series of balls. These holes also serve the function of wrench holes for fastening the washers on the spindles.

In Fig. 5 I have shown a modified construction of hub for the rear driving wheel. In this embodiment a hub casing 20 has formed at opposite ends seats 21, for ballbearing units 22, formed in hub members 21′ of a diameter increased in relation to the middle portion 20′ of the casing. The ballbearing units 22 comprise an outer ball race-member 23, an inner ball race-member 24 and having a series of balls 25 arranged between the race members and held in place by a retainer 26. The seats 21 have an annular surface 21ᵃ and a radial shoulder 21ᵇ which are adapted to frictionally engage the outer periphery and one radial side edge of the outer ball race-member 23 of said ballbearing unit 22.

A spindle 26 having a middle portion 26′ of given diameter is provided at opposite sides of said middle portion with integral collars 26ᵃ of increased diameter and at the outer sides of these collars I form seats 27 for the reception of the inner race-member 24 of said ballbearing units 22. These seats are provided with radial shoulders 27′ adapted to be positioned in vertical alignment with the radial shoulders 21ᵇ of the seat in the hub members 21′.

The spindle 26 is provided at the side of the seat 27 opposite to the radial shoulder 27′ with screw-threaded sections 27ᵃ of reduced diameter and adapted to receive nut washers 28 having internal screw thread bores 28′ and provided with annular centrally-located hub portions 28ᵃ adapted to engage the outer radial edges of the inner race-members 24 and to securely clamp the same against the shoulders 27′. The screw-threaded portion 27ᵃ is elongated to permit engagement with the forks of the frame (not shown) in the conventional manner. In the embodiment shown in Fig. 5, the ballbearing units 22 are provided at the outer side with dust shield elements 29 which are fastened to the outer race-members 23 and extend into close proximity with the inner race-members 24 thus preventing the entrance to the bearing of dust, dirt and the like.

The middle portion 21′ of the hub casing 20 is provided with a lubricating aperture 30 which preferably has communicating therewith a lubricating cup 31 thus enabling lubrication to be passed into the casing without the entry of dust and dirt.

The hub shown in Fig. 5, being, as aforesaid, a hub for a driving wheel has the hub casing member at one side provided with screw-threaded surfaces 32, 32′ for the purpose of mounting therein in the conventional manner a sprocket and washer not shown. In Fig. 6 I have shown a hub casing for the front wheel of a bicycle which is substantially similar to the embodiment shown in Fig. 5 except that the collars 26ᵇ have reduced radial collar portions 33 formed at the opposite sides thereof to engage inner race-members of ballbearing units substantially similar to those shown in Fig. 5.

In Fig. 1ᵃ I have shown a modified form of dust-shielding element adapted to be used in connection with the construction shown in Fig. 1. Said figure shows a construction which will be in all respects similar to that shown in Fig. 1 except that the threaded sections 7ᵃ and nut washers 8 are eliminated and a dust flange 34, fastened by screws 35, to the outer radial edges of the hub casing 2 and a bushing 35, are substituted therefor. The dust flange has an annular bore closely fitting the bushing 36 on the spindle portion 7ᶜ so as to exclude dust and dirt from the bearing. The ballbearing unit is further clamped to the spindle and locked in place by the hubs of the crank rods 10 and 11 abutting against the bushing 35 which hubs are preferably fastened to the spindle in the manner shown in Fig. 1.

It will be seen from the above that I have provided hubs for bicycle crank hangers and wheels in which ballbearing units, separable from the casing or housing, and shaft, may be mounted to provide increased efficiency in the ballbearing co-action between the hub casings and spindle and which will enable the ballbearing units to be completely enclosed and kept free from dust and dirt while at the same time providing for lubrication of the ball members of such ballbearing units.

Having described my invention, I claim:—

1. A hub for crank hangers and wheels of bicycles embodying, in combination, a cylindrical hub casing open at opposite ends, ballbearing units separable from said casing and composed of inner and outer race-members, ball members interposed between said race-members retainers for spacing apart said ball members, said hub having at opposite ends seats for frictionally engaging the outer race-members of said ballbearing units, a spindle having at opposite ends seats for the inner race-members of said ballbearing units, an annular radially-disposed member closing the outer face of said hub to prevent the access of dust and dirt to the ball members of said ballbearing units, and means at the outer end of the said spindle for locking the ballbearing units thereto.

2. A hub for crank hangers and wheels of bicycles embodying, in combination, a cylindrical hub casing open at opposite ends, ballbearing units separable from said casing and composed of inner and outer race-members, ball members interposed between said race-members, retainers for spacing apart said ball members, said hub having at opposite ends seats for frictionally engaging the outer race-members of said ballbearing units, a spindle having at opposite ends seats for the inner race-members of said ballbearing units, an annular radially-disposed member closing the outer face of said hub to prevent the access of dust and dirt to the ball members of said ballbearing units, the seats for the ballbearing race members in the casing and spindle being arranged to provide an annular space at the inner side of ballbearing units to permit access of lubricating from the inner side, and said hub casing being provided between its closed opposite ends with means for applying lubrication to the said ballbearing units.

In witness whereof, I have signed my name to the foregoing specification.

JOSEPH G. KOPSKY.